Sept. 17, 1963  R. V. MORR ETAL  3,103,778
RAKE BAR BEARING MOUNT

Filed Jan. 26, 1962  2 Sheets-Sheet 1

INVENTORS.
RALPH V. MORR.
VICTOR C. FUHRWERK,
WILLIAM D. FENT.
RICHARD E. CROWN,
BY
ATTORNEYS.

Sept. 17, 1963     R. V. MORR ETAL     3,103,778
RAKE BAR BEARING MOUNT

Filed Jan. 26, 1962     2 Sheets-Sheet 2

INVENTORS.
RALPH V. MORR.
VICTOR C. FUHRWERK.
WILLIAM D. FENT.
RICHARD E. CROWN.
BY
ATTORNEYS.

United States Patent Office 3,103,778
Patented Sept. 17, 1963

3,103,778
RAKE BAR BEARING MOUNT
Ralph V. Morr, Victor C. Fuhrwerk, William D. Fent, and Richard E. Crown, Celina, Ohio, assignors to Avco Corporation, Coldwater, Ohio, a corporation of Delaware
Filed Jan. 26, 1962, Ser. No. 168,996
3 Claims. (Cl. 56—377)

This invention relates to a rake bar bearing mounting and more particularly to the structure of this mounting designed to distribute the load imposed, thus reducing the stress in the rotating reel head to which rake bars are attached by a bearing, so that the expected life of the parts may be increased.

In so-called parallel bar type of rakes, rake teeth are carried on a plurality of bars connected at their ends to rotating reel heads, thereby imparting a reciprocating motion to the bars while rotating in a manner to impart a side delivery raking action to hay, or other material, raked from a swath into a windrow. In such an arrangement bearings are provided at the connection of the rake bar ends to the reel heads and at such connection considerable stress may be imposed on the reel head structure. In cases where a reel head is employed, made up of substantially circular steel sheet construction in the form of a wheel, it has been found that the solid connection of reel head bearing housing to such structure often results in stressing the metal to such an extent that cracks may result. In order that this problem may be solved without objectionable increase in the thickness and stiffness of the metal of the reel head, special consideration of the connection between the bearing housing and the reel head is important.

It is therefore a primary object of this invention to provide a connection between the reel head and the bearing housing for the rake bar bearing, which will distribute the loads imposed on the reel head structure over greater area, thereby reducing the stress to assure longer operating life for the reel head and adjacent parts.

Another object is to provide connections between the bearing housing and the reel head, wherein positive connection is afforded at the outermost connection to the reel head, while a resilient connection is afforded at a connecting member between the bearing housing and reel head at a position radially inward from the outermost positive connection, thereby to distribute the loads imposed on the reel head structure over greater area and to reduce the loads imposed on the bearings due to misalignment.

The above and other objects of the invention will appear more fully from the following more detailed description and by reference to the accompanying drawings, forming a part hereof and wherein.

Figure 1:
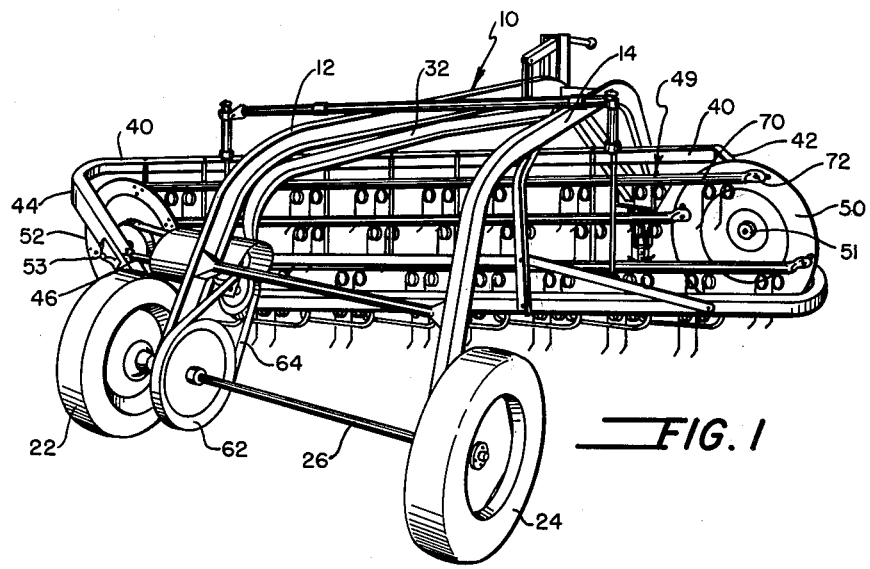
FIG. 1 is a perspective view of a rake of the type applying this invention, wherein rake bar bearings and reel head structure is shown.

Referring to the drawings, FIG. 1 shows a type of side delivery rake, known in the art as a parallel bar rake, which comprises an arched main frame 10, which when viewed in plan view is substantially V-shaped. The frame 10 has a pair of rearwardly extending legs 12, 14. At the forward end of the frame 10, the apex of the V, a hitch is provided whereby the frame may be coupled to the drawbar of a tractor so that the rake may be drawn over a field for raking operation. The frame 10 is supported at its rear end by a pair of ground wheels 22, 24 and spaced transversely to the line of draft, and are rotatable about a common axis and spaced outwardly of each frame leg 12, 14. Mounted on the main frame 10, and suspended therebeneath, is a subframe 32 which like the main frame 10 is generally V-shaped in plan form. The apex of the V faces forwardly and is pivotally connected to a vertical bracket secured to the left leg 12 of the main frame 10.

Carried on the subframe 32 is a rake basket 40 which extends diagonally relative to the line of draft of the rake. The rake basket 40 has a forward end 42 and a rear trailing end 44. The trailing and forward ends of the rake basket project laterally of the frame structure of the rake. The rake basket 40 is an integral part of the subframe 32 and with the subframe is held in proper position by compression stabilizer bar 46.

Rotatable in the basket 40 is a raking reel 49 comprising a pair of reel heads 50, 52, rotatable about laterally-spaced fore and aft extending shaft bearing axes 51, 53. Reel head 50 is rotatable with the shaft 51 at the forward end of the rake basket. The reel head 52 is driven, in the rake illustrated, by a belt drive made up of a belt 64 which drives from a sheave 62 on the wheel shaft 26 to a sheave on the reel head 52.

Figure 2:
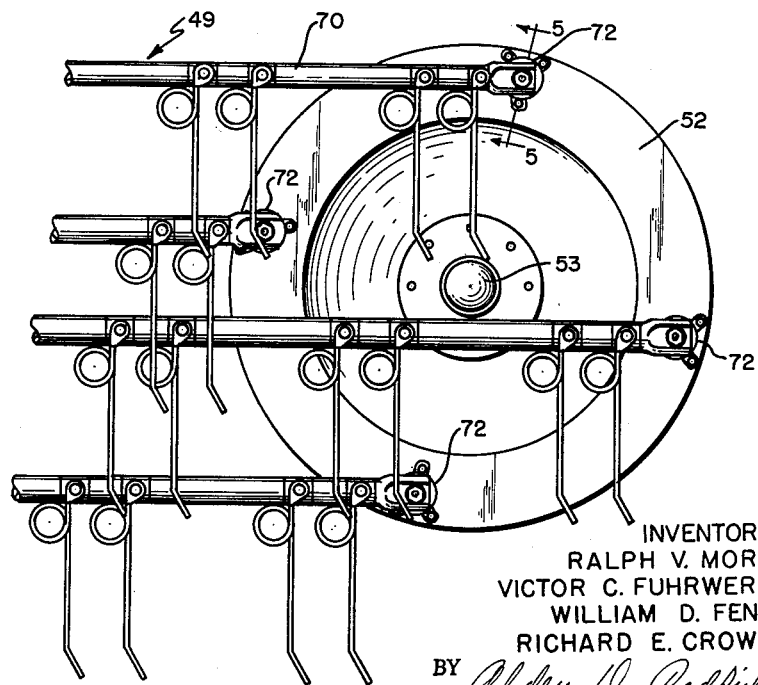
FIG. 2 is a close-up view showing connection of rake bars to one reel head, together with the general arrangement of the mounting of the rake bar bearing housing.
Figure 3:
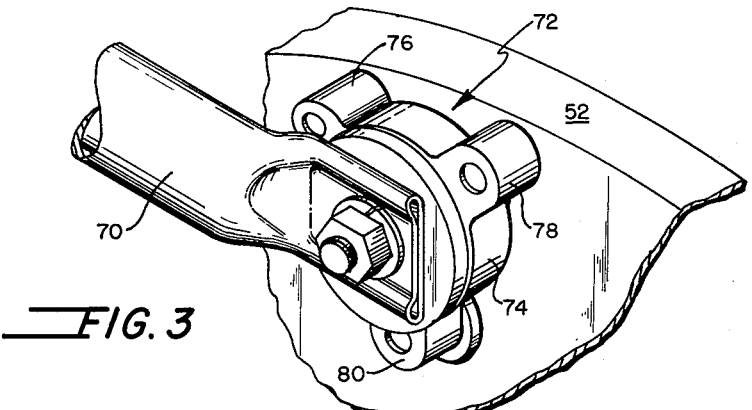
FIG. 3 is a perspective of the bearing connection to the reel head showing also the end of the rake bar.
Figure 4:
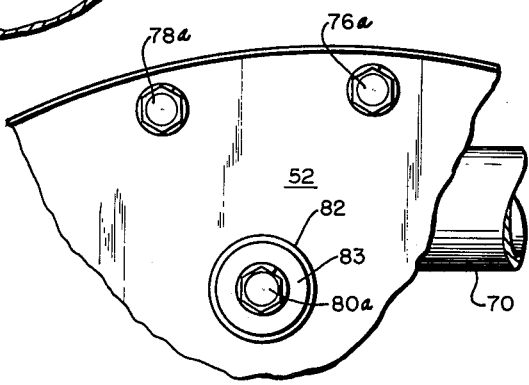
FIG. 4 is a showing of the connection shown in FIG. 3, but is a view on the opposite side of the reel head.
Figure 5:
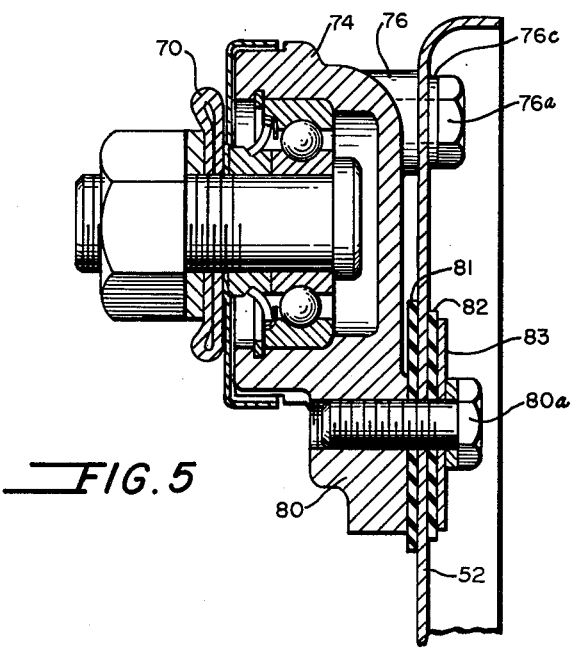
FIG. 5 is an enlarged section taken on the line 5—5 of FIG. 2 and shows a section through the bearing, the reel head, and the mountings, showing particularly the different structure between the outer bolt connections with positive metal-to-metal contact, and the inner connection with rubber washers affording a resilient connection.

The reel heads 50 and 52 are connected together in the rake illustrated by four rake bars 70 extending between reel head 50 and reel head 52, the ends of the rake bar being connected to the respective reel heads by a bearing assembly 72, there being four of such bearing assemblies on each reel head. Thus, the rotation imparted to the reel head 52 causes the assembly to rotate as a rake reel for accomplishing the raking purpose, which general arrrangement is characteristic of the so-called parallel bar type of rake. Referring particularly to FIG. 2, which is a close-up of the reel head 52 and the adjacent connecting rake bars 70, the four bearing assemblies 72 are shown. A perspective view of one of the bearing assemblies 72 is shown in FIG. 3. Considering the showing of FIGS. 2 and 3, the bearing assembly 72 is shown as provided with a bearing housing 74 with three attaching bosses 76, 78 and 80. The attaching bosses 76 and 78 are located near the outer periphery of the reel head 52, while the boss 80 is positioned radially inward from the bosses 76, 78. The rear view, FIG. 4, shows that the bearing housing 74 is secured by means of cap screws 76a, 78a, and 80a, extending through the reel head 52 into their respective bosses in the rake bearing housing 76, 78, and 80. The outer cap screws 76a and 78a (see FIGS. 4 and 5) are secured in place with a metal lock washer 76c on the backside. The connection for the boss 80a, located radially inward from the outer cap screw connections 76a and 78a, is materially different in the connecting means. In this connection of the cap screw 80a to the boss 80 there is provided a rubber washer 81 between the boss 80 and reel head 52, and a second rubber washer 82 on the opposite side of the reel head 52 and a washer 83, so that the cap screw connection 80a, with rubber washers 81, 82, provides a resilient connection between the bearing housing 74 and the reel head 52 by the provision of resilient rubber washers on both sides of the sheet metal surface of the reel head 52 at the connection radially inward from the rigid outer connection. In tightening the cap screws, the cap screws 76a and 78a are pulled tight against their respective metal washers, while the cap screw 80 is tightened by means of a torque wrench to approximately 40% of its recommended torque, which leaves substantial resiliency in the rubber.

It is important that with the positive connection of the outer cap screw connections 76a and 78a, that the radially inward positioned cap screw connection 80a is resiliently connected. Loads imposed will be thus spread over a larger area than would be the case if all three connections were rigid. The provision of the rubber washer 81 on one side and rubber washer 82 on the other side is also important. Rubber washer 82 is under the steel washer 83 and on the back side of the reel head, thereby providing resilient connection on both sides against the sheet metal surfaces of the reel head. Specifically, this accomplishes a further distribution of the stress by the combination of the rubber washer 82 and the steel washer 83 on the back side of the reel head, as well as the rubber washer 81 on the metal boss 80 on the side of the reel head where the bearing housing is secured. Such structure provides, as previously mentioned, a distribution of load under varying conditions. This resilient connection on both sides and in combination, as described, is important because the maximum load on the bearing housing, which in turn is transmitted to the reel head, is in one direction on the righthand reel head 50 and the opposite direction on the lefthand reel head 52. In addition, the loading apparently reverses in a cyclic manner during field operation, causing the reel heads to deflect in both directions from normal in one loading and unloading cycle of the rake teeth. The rubber washers 81 and 82, in cooperation with the adjacent metal parts on both sides of the reel head, have been found to distribute the load applied, in either direction, over a greater area and thus reduce the stress concentration which might otherwise cause early failure of the reel head.

It has been found as a matter of actual practice that the reel head life is materially increased by the structure disclosed, over the all-rigid connection, when the resilient type of mounting is used on the inner cap screw connection 80a.

The invention has been described by reference to a structure found practical in actual operation, but it is understood that modifications and equivalents are intended within the scope of the following claims.

We claim:

1. In a side delivery rake having a rotatable reel head of circular configuration and a plurality of rake bars connected to said reel head, means to connect each of said rake bars to said reel head to diminish concentration of stress on said reel head, a bearing housing, a rake bar bearing mounted in said bearing housing, stress resistant interconnecting means interconnecting said bearing housing with said reel head, said stress resistant interconnecting means comprising at least one first connecting means positioned adjacent the outer periphery of said reel head in positive, metal-to-metal contact therewith, and second connecting means positioned radially inward of the periphery of said reel head, a spacer on each side of said reel head of resilient deformable material, said second connecting means being secured against each of said spacers without metal-to-metal contact between said second connecting means and said reel head, said first and second connecting means distributing the load applied to said reel head over a substantial area thereof, and said second connecting means substantially reducing the stress concentration placed upon said reel head during rotation thereof.

2. The invention as defined in claim 1 wherein the axis of rotation of said bearing is positioned between said first connecting means and said second connecting means.

3. The invention as defined in claim 2 wherein said first connecting means, in interconnection with said reel head, is tightened to near maximum recommended torque and said second connecting means, in interconnection with said spacers, is tightened to about 40% of recommended torque, whereby said spacers retain substantial resiliency.

References Cited in the file of this patent

UNITED STATES PATENTS

| | | |
|---|---|---|
| 2,621,465 | Klemm | Dec. 16, 1952 |
| 2,690,045 | Erickson et al. | Sept. 28, 1954 |
| 2,750,729 | Skromme et al. | June 19, 1956 |
| 2,762,189 | Vutz | Sept. 11, 1956 |